United States Patent [19]
Young

[11] 3,806,906
[45] Apr. 23, 1974

[54] CELL SURVEILLANCE MONITOR FOR A POWER CONVERTER

[75] Inventor: John A. I. Young, Peterborough, Ontario, Canada

[73] Assignee: Canadian General Electric Company, Limited, Toronto, Calif.

[22] Filed: Mar. 22, 1972

[21] Appl. No.: 236,939

[30] Foreign Application Priority Data
June 16, 1971 Canada .................................. 115746

[52] U.S. Cl. ............ 340/253 E, 321/12, 340/248 E
[51] Int. Cl. .......................................... G08b 21/00
[58] Field of Search ............ 340/248 E, 253 E, 253, 340/324 AD, 324 S; 321/12, 14; 219/109, 114

[56] References Cited
UNITED STATES PATENTS
2,678,418   5/1954   Black .......................... 340/248 E X
3,548,403   12/1970  Johnson .................... 340/324 S UX
3,179,883   4/1965   Farrow ...................... 340/324 AD X Primary Examiner—David L. Trafton
Assistant Examiner—Daniel Myer
Attorney, Agent, or Firm—Arnold E. Renner; Harold H. Green, Jr.

[57] ABSTRACT

Circuitry for indicating the failure of any of the cells in each bridge of an electric power converter to conduct current properly. That is, if any cell will not carry either the full current required that it carry or any current at all, the circuitry of this invention will signal a fault occurrence. Sensing means for each cell outputs a first signal as long as its cell is conducting current properly. Upon failure of any cell in a bridge to conduct properly, a detector for that bridge outputs a second signal. A logic circuit for all the bridges outputs further signals indicative of the number of detectors signalling this failure which may be used to actuate fault classification and/or protection equipment. The detectors are inhibited when the converter is supplying a low current to a load to prevent them from indicating failure of the cells to conduct properly during this time.

8 Claims, 4 Drawing Figures 3,806,906

CELL SURVEILLANCE MONITOR FOR A POWER CONVERTER

BACKGROUND OF THE INVENTION

This invention relates to circuitry for indicating the failure of any of the cells in an electric power converter to conduct current properly.

Electric power converter systems take many forms; the most complicated of which have one or more bridges in the forward and reverse converters for supplying power to a load. In both single and dual converter systems it is desirable to include circuitry which will protect it for some or all of the following fault occurrences: converter overcurrent, loss of cell conduction, converter conduction through or converter failure resulting in high AC input current, resistive paths to ground from the converter DC buses, control power supply loss and control power phase loss.

This invention deals with circuitry which will indicate loss of cell conduction in the system. Throughout this disclosure this fault occurrence will be referred to as failure of a cell to conduct current properly. That is, if any cell will not carry either the full current required or any current at all, the circuitry of this invention will signal a fault occurrence.

SUMMARY OF THE INVENTION

According to the invention, sensing means for each cell outputs a first signal as long as its cell is conducting current properly. In one embodiment of the invention, upon failure of any cell in a bridge to conduct properly, a detector for that bridge outputs a second signal. A logic circuit for all the bridges in the converter outputs further signals indicative of the number of detectors signalling this failure which may be used to actuate fault classification and/or protection equipment. The detectors are inhibited when the converter is supplying a low current to the load to prevent them from indicating failure of the cells to conduct properly during this time.

DESCRIPTION OF THE DRAWINGS

Further features of this invention will be apparent from the following description made with reference to the accompanying drawings, in which.

DETAILED DESCRIPTION

Figure 1:
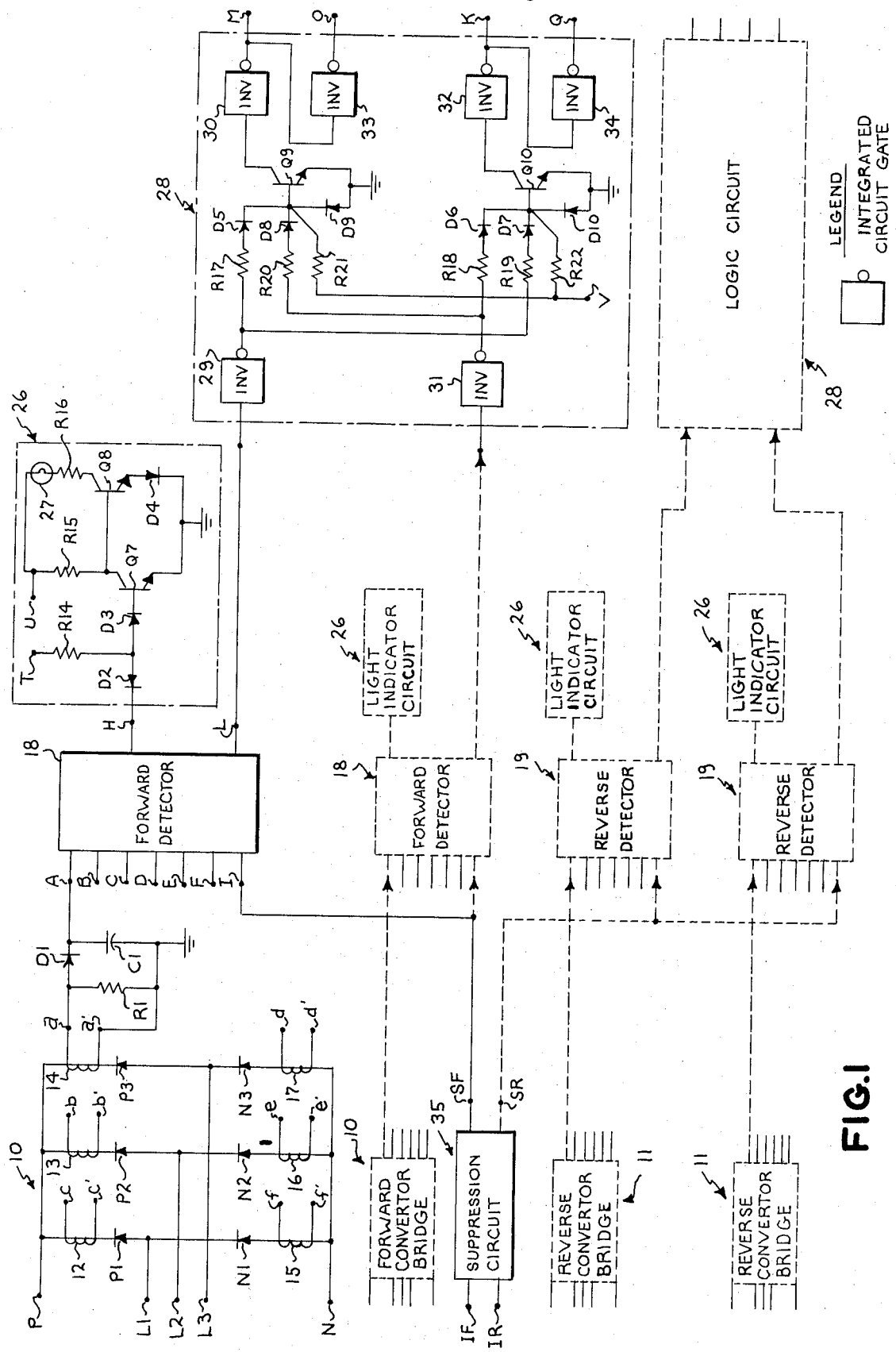
FIG. 1 is a schematic drawing of one embodiment of the circuitry according to the present invention.

Referring now to FIG. 1, two bridges 10 of the forward converter and two more bridges 11 of the reverse converter are represented. Only one of the forward bridges 10 has been shown in detail for the sake of simplicity. The reverse bridges 11 are the same as bridge 10 except for the sense of the cells therein. In the forward bridge 10, unidirectional semiconductor devices P1 to P3 inclusive and N1 to N3 inclusive are shown. These devices may be, for example, thyristors (silicon controlled rectifiers), diodes or even mercury arc rectifiers but shall, hereinafter be referred to as thyristors. Three phase AC is applied to the bridge via lines L1 to L3 inclusive and DC current is supplied to a load from terminals P and N although it is to be clearly understood that this invention is not limited to use with the converter system shown. Although two forward and two reverse three phase double way converter bridges have been illustrated, the system may take many other forms as will later be more evident. Where there are several bridges in either converter, they generally all supply power to the same load though. Although a protective fuse and inductive coil are usually connected in series with each cell, they have not been shown in the bridge 10 highlighted in FIG. 1 to further simplify that drawing.

Coils 12 through 14 for thyristors P1 through P3 respectively and coils 15 through 17 for thyristors N1 through N3 respectively are provided. These coils each have a conductor, connected to one terminal of their respective thyristor, passing through them so that they output a $di/dt$ waveform for their thyristor. That is, they output a voltage whose presence depends upon changing current through their cell. Therefore, if a cell does not turn on, there will be no output from its coil. While the coils are depicted in FIG. 1 as directly coupled, each coil may instead be placed in the proximity of the inductive coil, mentioned earlier, to be inductively coupled to that coil. The output from the coils in the latter arrangement will be essentially the same as that for the arrangement shown in the drawing.

The output terminals $a$ and $a'$ of coil 14 are shown connected to an energy storage circuit consisting of a resistor R1, a diode D1 and a capacitor C1. Together, this coil and energy storage circuit form a current sensor for thyristor P3. When thyristor P3 turns on, the output from coil 14 will charge capacitor C1 through diode D1. While thyristor P3 is off, diode D1 prevents capacitor C1 from discharging through resistor R1 or the coil. The output of the storage circuit is connected to terminal A of a detector 18. Coils 12, 13 and 15 through 17 are provided with similar energy storage circuits for their respective thyristors. These coils are shown in FIG. 1 with the lettering of their output corresponding with the lettering of the terminal of detector 18 to which their energy storage circuit, not shown, would be connected; e.g., the output of the energy storage circuit for coil 13 would be connected to terminal B of the detector 18. The operation of the sensor will be described in more detail once the detector 18 has been described. The other bridge 10 and the bridges 11 have similar sensors for each cell therein. The connection of one such sensor for that bridge 10 is illustrated connected to a terminal of its detector 18 by a dotted line. The connection of a sensor for each reverse bridge 11 is similarly illustrated connected to its detector 19.

Figure 2:
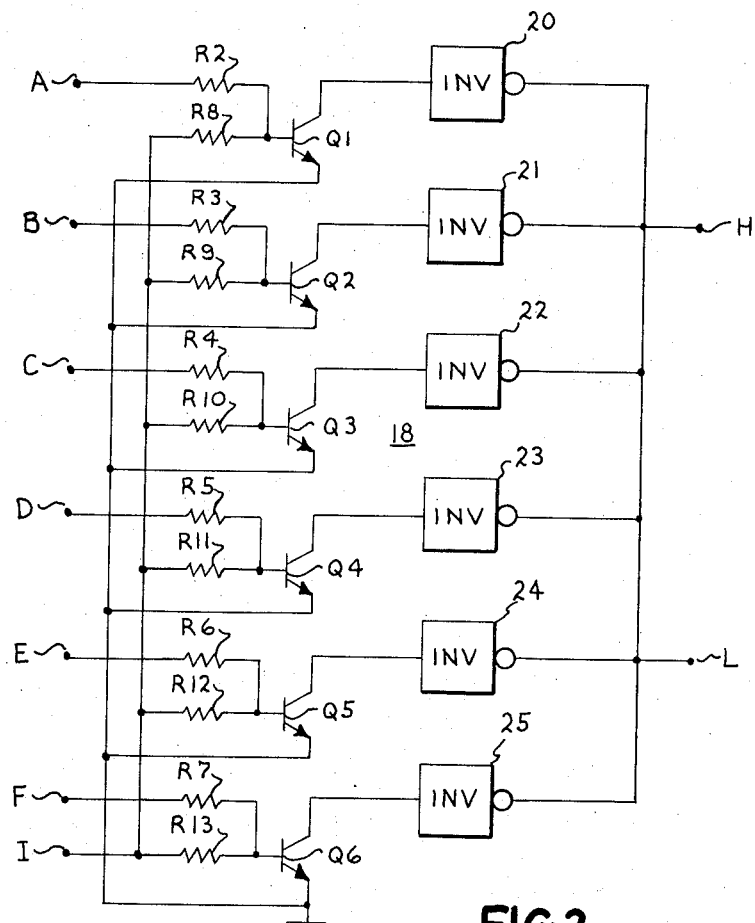
FIG. 2 is a circuit diagram of the detector circuit of FIG. 1.

Forward detector 18 is shown in detail in FIG. 2. That figure shows terminals A through F connected through resistors R2 through R7 respectively to the base of transistors Q1 through Q6 respectively. An additional terminal I is connected through resistors R8 through R13 to the bases of the same transistors respectively. The collectors of transistors Q1 through Q6 are connected through respective integrated circuit inverting gates 20 through 25 of two electrically equivalent terminals H and L. As long as sufficient current is supplied to transistors Q1 through Q6 by either all of terminals A through F or by terminal I to maintain them conductive, a logic 1 signal will appear at output terminals H and L. It follows then that if the voltage at any of terminals A through F falls below the threshold voltage for its transistor, that transistor will turn off, unless sufficient voltage is present at terminal I. If any of the transistors Q1 through Q6 ceases to conduct, the output at terminals H and L will go to a logic 0 state.

In connection with FIG. 1 it has been stated that the outputs of the sensors for each bridge are connected to a respective terminal A through F of the detector for that bridge. The operation of the invention thus far disclosed will now be described making reference to the forward bridge 10, shown in detail, and its sensors and detector. When a cell, such as thyristor P3, turns on the capacitor in its energy storage circuit, capacitor C1, will charge in the manner previously described. When the voltage across the capacitor C1 equals the threshold voltage of transistor Q1 (FIG. 2) that transistor will turn on. By appropriately selecting the size of capacitor C1, transistor Q1 can be held on during the time in each cycle when thyristor P3 is off only as long as this thyristor turns on regularly to maintain the voltage across the capacitor. Since the sensor and input portion of the detector for the other thyristors in the bridge are the same as those for thyristor P3, it follows that as long as all the thyristors turn on regularly and sufficiently to maintain a voltage at least equal to the threshold voltage of the transistor in the input portion across the capacitor in their sensor, the output from terminals H and L will be a logic 1 signal. This state, where all the transistors in the detector are held on, then defines the condition where all the cells are conducting properly. Conversely, when any one or more of the transistors is allowed to turn off, the output of the detector from terminals H and L will be logic 0 signals indicating that one or more of the cells is not conducting current to the load properly.

Figure 4:
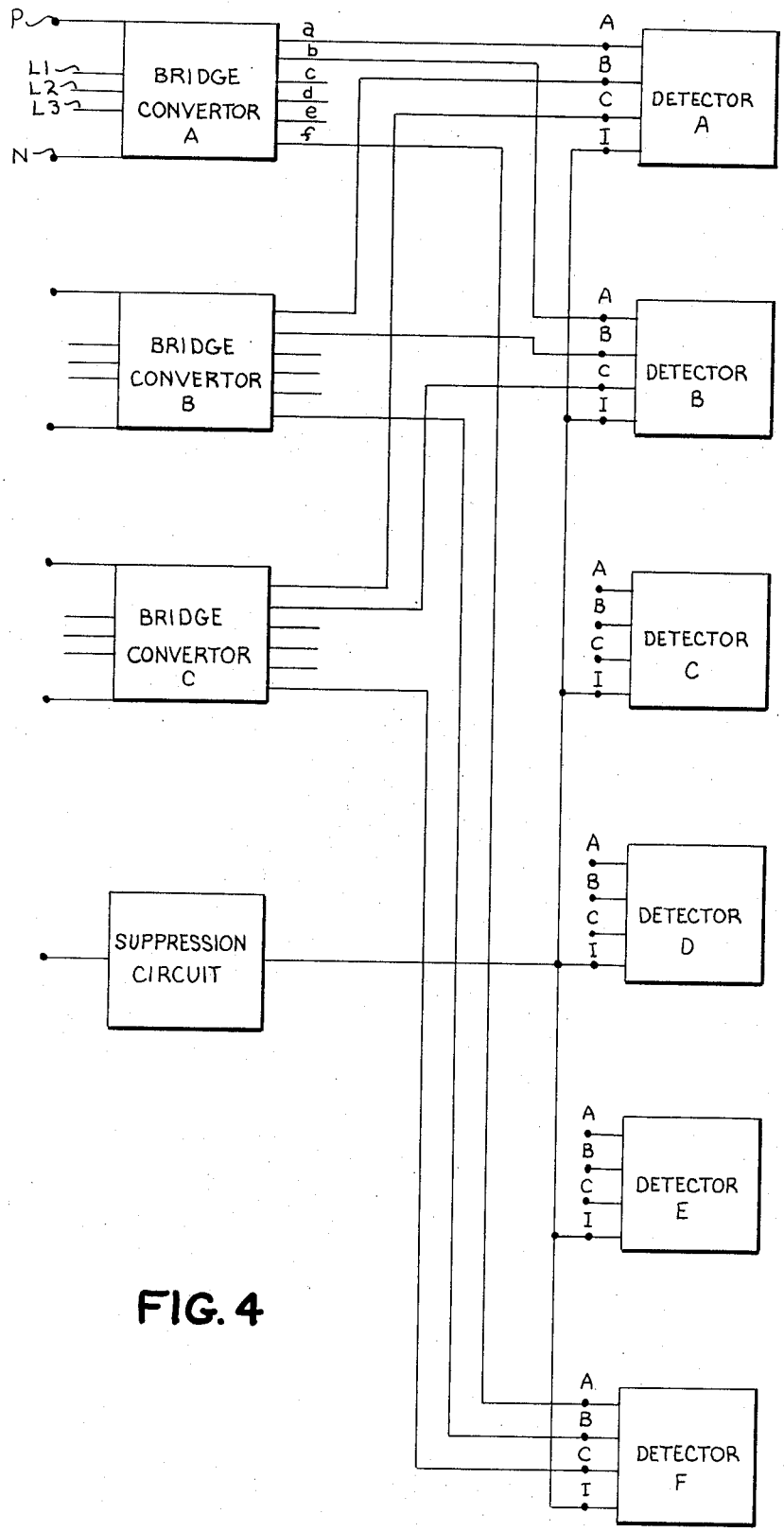
FIG. 4 is a schematic circuit showing an alternative form of detection.

In FIG. 1 another forward detector 18 is illustrated for the other forward bridge 10 and similar reverse detectors 19 are illustrated for the reverse bridges 11. Since both the forward and reverse converters contain more than one bridge they are known as multiple bridge converters. Since all the inputs to each detector in that figure are illustrated coming from the six cells of a single bridge, the detection shown is doen on a bridge basis. However, it is also possible to have the inputs to each detector come from like cells in corresponding legs of the bridges in each converter. This form of detection is known as detection on a leg basis and is illustrated in FIG. 4. in this Figure, in which for sake of simplicity only a portion of the connections have been shown, each of three bridge converters has its corresponding cell connected to a single detector. For example, as illustrated, leg "a" of each converter is connected to detector "a," leg "b" to detector "b" and leg "f" to detector "f." Similar connections for the other three legs to the corresponding detectors would complete connections in this mode. As was the situation in the FIG. 1 embodiment, a suppression circuit may be provided for connection to an I terminal of each of the detectors. The bridge basis of detection is often preferred, since in cases, where both of the P1 cells in the forward converter fail to carry current, the bridge detection scheme would indicate faults in both bridges whereas the other scheme would only indicate a single fault. It has, therefore, been illustrated in FIG. 1 although either detection arrangement could be practiced.

To visibly indicate the logic state of the output signals from terminals H and L, and hence warn an operator of failure of one or more of the cells monitored by a detector, a light indicator circuit 26 (FIG. 1) is connected to either terminal H or terminal L of each detector. Each indicator circuit 26, in FIG. 1 is connected to terminal H, consists of three diodes D2, D3 and D4, resistors R14, R15 and R16, transistors Q7 and Q8 and a light 27. As long as a logic 1 signal appears at terminal H, the light will be off. However, as soon as a logic 0 signal appears at the terminal indicating that one or more cells is not conducting properly, transistor Q7 will be turned off, transistor Q8 will turn on and the lamp 27 will light. Since the indicator circuits 26 do not indicate which cell or cells monitored by each detector are not conducting properly, light or other indicating means may be switched from terminals A through F at the detector input to determine this.

Also illustrated in FIG. 1 are two logic circuits 28, one for each converter. In the logic circuit for the forward converter, output terminal L is connected through an inverting gate 29, a resistor R17, a diode D5, a transistor Q9, and another inverting gate 30 to output terminal M. Either terminal H or terminal L of the detector for the other forward bridge is shown connected through an inverting gate 31, resistor R18, diode D6, transistor Q10 and inverting gate 32 to terminal K also at the output of the logic circuit. The output of gate 29 is also connected to the base of transistor Q10 via resistor R19 and diode D7; the output of gate 31, the base of transistor Q9 via resistor R20 and diode D8. Diodes D9 and D10 are base diodes. If a negative voltage is applied via terminal V and resistors R21 and R22 to the base of transistors Q9 and Q10 respectively, then when the detector for the bridge 10, shown in detail, indicates that one or more of the cells in that bridge is not conducting properly by outputting a logic 0 signal, transistor Q9 will be turned on thus outputting a logic 1 signal from terminal M while transistor Q10 will be held off by the negative voltage. If, however, the second forward detector also outputs a logic 0 signal, then transistor Q10 will also be turned on and a logic 1 signal will appear at the output terminal K. The operation of this logic circuit, therefore, provides an indication of which detector circuits are signalling failure of one or more of their cells to conduct properly. The logic 1 signals from terminals M and K may be used to actuate any suppression circuit common to the electric power conversion art for suppressing firing of the thyristors and perhaps also interrupting power to the converter when these signals appear. (One suppression circuit which may be used is the one disclosed in Canadian Patent Number 925,941 issued May 8, 1973, entitled "Suppression Decision Circuit for a Power Converter Gate Pulse Generator" by John A. J. Young.) Inverting gates 33 and 34 merely provide logic 0 signals at terminals 0 and Q during this time.

Figure 3:
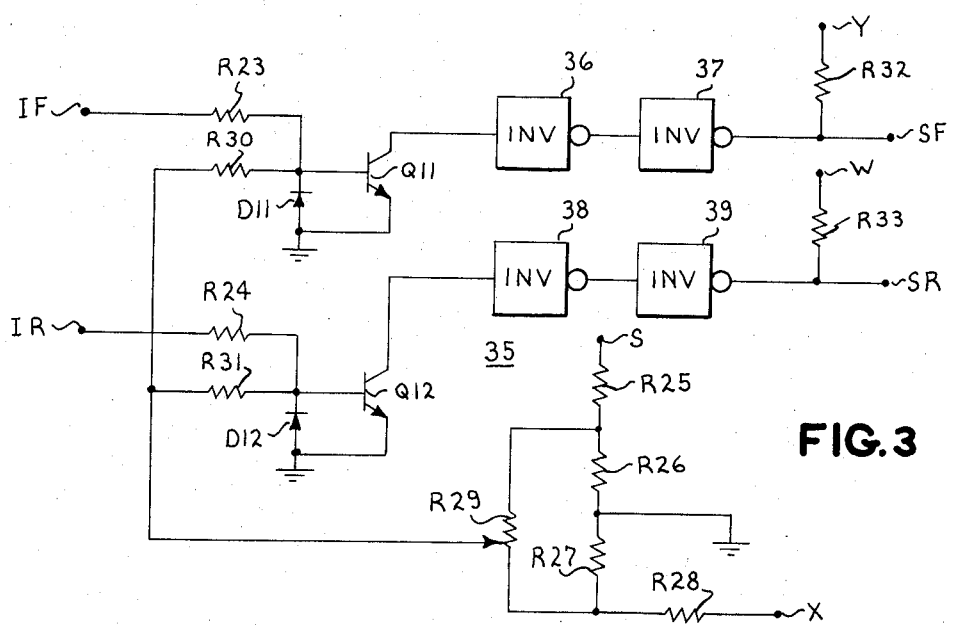
FIG. 3 is a circuit diagram of the suppression circuit of FIG. 1.

During the time that very low currents are being supplied by either converter, it is necessary to inhibit the detectors of that converter to prevent a loss of current fault indication by the circuitry. To this end, then, a detector suppression circuit 35 (FIG. 1) is provided for the system. This suppression circuit is shown in detail in FIG. 3. In that figure a current signal, obtained from an AC current transformer rectifier circuit at the input of each forward bridge, is applied to a terminal IF. Another current signal is similarly obtained for the reverse bridges and applied to a terminal IR. The first signal is applied via terminal IF to a forward suppression circuit consisting of resistor R23, diode D11, transistor Q11, inverting gates 36 and 37 and output terminal SF. The second signal is applied to the reverse suppression circuit, via terminal IR, consisting of resistor R24, diode D12, transistor Q12, inverting gates 38 and 39 and output terminal SR. The output of a bias circuit, consisting of resistors R25 through R28, potentiometer R29 and sources of negative voltage for terminal X and positive voltage for terminal S, is applied to the bases of transistors Q11 and Q12 via resistors R30 and R31 respectively. Operation of the forward suppression circuit portion of the detector suppression circuit will be described only since both portions operate alike. Basically, then, when the sum of the currents supplied via resistors R23 and R30 to transistor Q11 is greater than the threshold current required for that transistor, it will turn on and a logic 0 signal will appear at output terminal SF. FIG. 1 shows this output terminal connected to input terminal I of each forward detector 18. It also shows the output terminal SR connected to the I terminal of each reverse detector 19. Where very low currents are being supplied by the forward converter, say, the voltage across the capacitor in the sensors for that converter may fall below the threshold voltage of its transistor in the detector input so that the circuitry will indicate a fault occurrence, which, of course, is undesirable for this condition. However, with the suppression circuit 35 included, if the current signal applied at terminal IF falls below the reference signal from the bias circuit portion of this circuit, a logic 1 signal appearing at output terminal SF and applied to the forward detectors at terminal I can be chosen so as to maintain all of the transistors in the detectors input on during this time thereby preventing a fault occurrence indication for this condition. To this end then, positive voltages are applied to terminals Y and W via resistors R32 and R33. The sensitivity of the suppression circuit is adjusted by varying the slides of potentiometer R29. With the dual converter system disclosed, the detectors for one of the converters will be suppressed as long as only the other converter is conducting, of course.

Accordingly, there has been disclosed a novel system for indicating loss of cell conduction in an electric power converter which is both flexible and reliable. The detectors are easily modified to provide detection of loss of cell conduction for any converter system on the basis of either bridge or leg detection. The logic circuit for each bridge can be easily modified where more than two detectors are used. In this case, the additional inputs to the logic circuit are interconnected with all the inputs as the two inputs shown in FIG. 1 are interconnected so that now any two or more detectors simultaneously signaling a loss of cell conduction fault occurrence will turn on the second transistor gate. The suppression circuit, of course, need only contain one converter suppression portion and the bias portion thereof for single way converter system application.

What is claimed is:

1. In an electrical power conversion system having at least one bridge converter, including a plurality of cells, connected to a load for supplying power thereto, circuitry for said converter for indicating failure of a cell within said bridge to conduct current properly comprising:

a. current sensing means for each cell in said bridge, said current sensing means each outputting a first signal as long as its associated cell is conducting current properly;

b. at least one detector, said detector monitoring the outputs of a number of said current sensing means and outputting a second signal when any one of said first signals is absent; and, c. means for supplying an inhibiting signal to said detector when said converter is supplying less current than a predetermined reference current to said load whereby said detector is prevented from outputting said second signal.

2. The invention in accordance with claim 1 further including means responsive to said second signal to indicate that the detector is signaling a failure.

3. In an electric power conversion system having a plurality of bridges, each including a plurality of cells, connected to a load for supplying power thereto, circuitry for indicating failure of any of the cells in said bridges to conduct current properly comprising:

a. current sensing means for each cell in said bridges, said current sensing means each outputting a first signal as long as its cell is conducting current properly;

b. a plurality of detectors each associated with a prescribed number of said cells, each detector monitoring the outputs of its associated current sensing means and for outputting a second signal when any of said first signals is absent;

c. logic circuit means connected to the outputs of a plurality of said detectors, said logic circuit means outputting further signals indicative of the number of said detectors signaling said failure; and, d. means for selectively supplying an inhibiting signal to each of said detectors when said bridges are supplying less current than a predetermined reference current to said load whereby each of said detectors is prevented from outputting a second signal.

4. The electric power conversion system in accordance with claim 3 further including means responsive to the output of each detector for indicating when said detector is signaling a failure.

5. In an electric power conversion system having a plurality of bridge converters, each including a plurality of cells, connected to a load for supplying power thereto, circuitry for said converters for indicating failure of a cell within a bridge to conduct current properly comprising:

a. current sensing means for each cell of a bridge, said current sensing means each outputting a first signal as long as its cell is conducting current properly;

b. a detector, associated with each bridge, said detector monitoring the outputs of a number of said current sensing means and outputting a second signal when any of said first signals is absent;

c. logic circuit means connected to the outputs of a plurality of said detectors, said logic circuit means outputting further signals indicative of the number of said detectors signaling said failure; and, d. means for supplying an inhibiting signal to each of said detectors when its associated bridge is supplying less current than a predetermined reference current to said load whereby such bridge is prevented from outputting a second signal.

6. The electric power conversion system in accordance with claim 5 further including means responsive to the output of each detector for indicating when said detector is signaling a failure.

7. In an electric power conversion system having a plurality of bridges, each including a plurality of cells, connected to a load for supplying power thereto, circuitry for said bridges for indicating failure of any of the like cells in corresponding legs of said bridges to conduct current properly comprising:

a. current sensing means for each cell in said bridges, said current sensing means each outputting a first signal as long as its cell is conducting current properly;

b. a detector for the like cells in said legs of said bridges, each detector monitoring the outputs of said current sensing means for said cells and outputting a second signal when any of said first signals is absent;

c. logic circuit means connected to the outputs of a plurality of said detectors, said logic circuit outputting further signals indicative of the number of said detectors signaling said failure; and, d. means for selectively supplying inhibiting signals to said detectors when said bridges are supplying less current than a predetermined reference current to said load whereby a detector is prevented from outputting a second signal.

8. The electric power conversion system in accordance with claim 7 further including means responsive to the output of each detector for indicating which of said detectors are signaling said failure.

* * * * *

UNITED STATES PATENT OFFICE
CERTIFICATE OF CORRECTION

PATENT NO. : 3,806,906
DATED : April 23, 1974
INVENTOR(S) : John A. I. Young

It is certified that error appears in the above-identified patent and that said Letters Patent are hereby corrected as shown below:

Page 1, after "Assignee" should read --Canadian General Electric Company, Limited, Toronto, Ontario, Canada--.

Column 2, line 63, delete "of" and substitute --to--.

Column 3, line 46, delete "doen" and substitute --done--;
line 51, delete "in" (second occurrence) and substitute --In--.

Column 4, line 57, delete "John A. J." and substitute --John A. I.--.

Column 6, line 9, delete "one".

Signed and Sealed this nineteenth Day of August 1975

[SEAL]

Attest:

RUTH C. MASON
Attesting Officer

C. MARSHALL DANN
Commissioner of Patents and Trademarks